INVENTORS
Christopher Edmund Gervase Bailey
David Harker Paul
BY [signature]
AGENT INVENTORS
Christopher Edmund Gervase Bailey
David Harker Paul
BY [signature]
AGENT Patented Oct. 5, 1954 2,691,095

UNITED STATES PATENT OFFICE 2,691,095

CIRCUIT ARRANGEMENT FOR PHASE OR FREQUENCY MODULATED OSCILLATIONS

Christopher Edmund Gervase Bailey, London, and David Harker Paul, Loughborough, England, assignors to Hartford National Bank and Trust Company, Hartford, Conn., as trustee Original application October 1, 1948, Serial No. 52,342. Divided and this application February 4, 1950, Serial No. 142,424

8 Claims. (Cl. 250—15)

This invention relates to circuit arrangements for phase or frequency modulated oscillations.

It is known to interlock two unmodulated oscillations of widely different frequencies generated by two oscillators, according to which in case the frequency of the high-frequency oscillation is a (high) multiple of the frequency of the lower frequency oscillation, short electrical impulses are derived from the lower frequency oscillator having a repetition frequency equal to that of the lower frequency oscillation and these are combined in a phase comparison device (constituted by a diode-peak detector circuit) with the high-frequency oscillations, the output of the phase comparison device being fed through D. C.-passing connections including a low-pass filter having a very low cut-off frequency, to frequency-control means associated with either of the oscillators so as to interlock as regards frequency the high-frequency oscillation and a higher harmonic of the pulse voltage.

The invention is based on the recognition that appropriate modifications of the concerned type of circuit arrangements lead to circuit arrangements, which may be used advantageously in phase or frequency modulation transmitters and/or in transmitting systems comprising a number of synchronized phase or frequency modulations transmitters.

The circuit arrangement for phase or frequency modulated oscillations according to the invention is characterized by a source of high-frequency voltages and a source of recurrent pulses with a lower repetition frequency, wherein the voltage of one of the sources is phase or frequency modulated by a modulation voltage and the other source is constituted by an oscillator associated with a frequency modulator, a phase-comparison-device with inputs connected to both said sources and of which the output is connected to the input of the frequency-modulator through D. C.-passing connections including a low-pass filter passing said modulation voltages so as to automatically interlock as regards frequency and modulation the high-frequency voltage and a higher harmonic of the pulse voltage.

If in a circuit arrangement according to the invention the lower frequency pulse voltage is modulated in phase or frequency, interlocking of the high-frequency voltage with a high harmonic of the pulse repetition frequency results in that high-frequency oscillations with relatively high central frequency and wide sweep are generated, the central frequency of the high-frequency oscillations showing the same stability as that of the pulse voltage, which stability consequently may be very high. This circuit arrangement acts as a frequency multiplier with regard to the pulse repetition frequency and modulation; the multiplication factor, which preferably is at least 10, may be chosen very high, e. g. 100 or 200.

When using the last mentioned circuit arrangement in transmitters the high-frequency oscillator may be used, e. g. as transmitter-driver stage, but according to a further aspect of the invention in high-power transmitters it is particularly advantageous to have the transmitter-driver stage constituted by a second high-frequency oscillator interlocked as regards frequency and modulation with the first high-frequency oscillator by means of a second phase-comparison device with inputs connected to both said high-frequency oscillators and of which the output is connected through a low-pass filter passing D. C.- and modulating voltages to the input of a second frequency modulator associated with the second high-frequency oscillator.

Alternatively, the first mentioned circuit arrangement according to the invention may be modified so as to obtain interlocking of a lower frequency pulse generator with a phase or frequency modulated high-frequency voltage; this results in the generation of an oscillation with relatively low central frequency and small sweep. Then the circuit arrangement acts as a frequency divider with regard to the frequency and its modulation of the high-frequency voltage, wherein the dividing factor may again be as high as e. g. 100 or 200.

In a further development of this aspect of the invention the frequency modulated oscillation of high central frequency is heterodyned with a high harmonic of the frequency of the low frequency pulse generator, the heterodyne product being then compared in a phase comparison stage with a lower harmonic of the frequency of the lower frequency oscillator, whereafter the output voltage of this phase comparison stage controls the frequency and modulation of the lower frequency generator.

The invention will now be explained more fully by reference to the accompanying drawings showing, by way of example, embodiments thereof.

Figure 1:
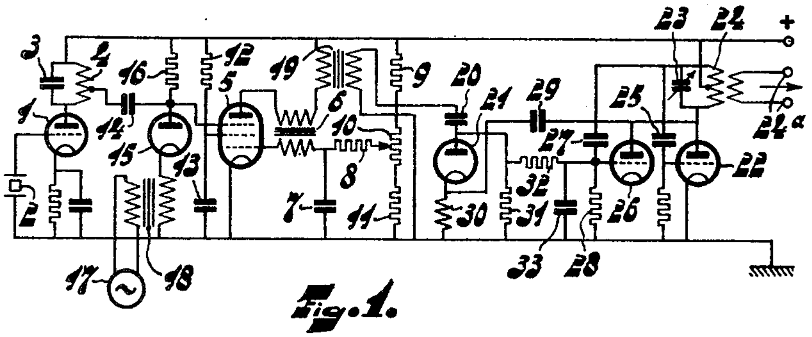
Figure 1 shows a frequency or phase modulation circuit arrangement according to the invention.

Referring now to Figure 1, a triode valve 1 is connected in known manner as a crystal oscillator, having a crystal 2 in its grid circuit and in its anode circuit a condenser 3 and an inductance 4 connected in parallel and tuned to the frequency of the crystal 2 and operating by virtue of its anode to grid capacity. A pentode valve 5 is connected in known manner as a blocking oscillator, generating saw-tooth waves and operating by virtue of a reversing impulse transformer 6 connected between its anode and grid. The repetition period of the saw-tooth waves generated by the valve 5 is determined by the product of a capacity 7 and a resistance 8 together with the proportion of the high tension supply voltage fed to resistances 8 by resistance 9, 10 and 11 in potentiometer connection. The screen grid voltage of valve 5 is supplied via resistance 12 and the screen grid is decoupled to earth by a condenser 13.

The exact moment of triggering of valve 5 is further determined by its suppressor grid potential, for example if the valve 5 is a Mullard valve type EF50, by the moment the suppressor grid reaches approximately −15 volts with respect to cathode.

A portion of the oscillating voltage across the inductance 4, of say, about 15 volts in amplitude, is tapped off and taken via condenser 14 to the anode circuit of a diode valve 15 which in combination with a resistance 16 and the condenser 14 is used as a clamping diode and ensures that the most positive peaks of the oscillations supplied to it are maintained at substantially the potential of the diode cathode. This cathode potential is varied slightly by a modulation voltage from audio-frequency source 17 and appearing across the secondary of a transformer 18.

Figure 2:
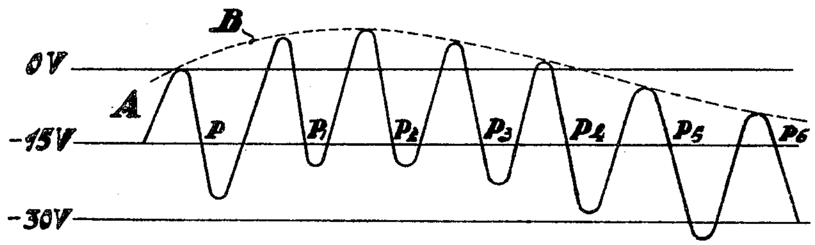
Figure 2 is a diagram illustrating the mode of operation of part of the circuit arrangement in Figure 1.

Figure 2 shows by curve A the deformed sinusoidal oscillation appearing at the suppressor grid of the valve 5 in consequence of a cathode potential variation of the diode 15 indicated by curve B, and it will be seen that the points $P_1$, $P_2$, $P_3$ . . . $P_6$ at which the suppressor grid falls to −15 volts, or any other suitable voltage as determined by the valve 5, occur advanced or delayed in phase according to the modulation voltage.

Provided that the modulation voltage supplied at 18 is small compared with 15 volts, if using a Mullard valve type EF50, the phase modulation is substantially a linear function of the modulation voltage. Hence, the saw-tooth wave is in turn phase modulated and this phase modulated saw-tooth wave is in turn differentiated by an impulse transformer 19. The output of the impulse transformer 19 is supplied via a coupling condenser 20 to a phase comparison device with diode 21 in order to interlock a high-frequency oscillator.

The high-frequency oscillator is constituted by a triode 22, with a tunable resonant circuit comprising tuning condenser 23 and inductance 24 in its anode circuit and a back-coupling condenser 25 in the grid circuit. Output-terminals are shown at $24^a$. Associated with the oscillator 22—25 is a frequency modulator consisting of a triode 26 connected in parallel with the oscillator triode 22 and operative as reactance valve by virtue of the oscillator voltage being fed through the intermediary of a 90° phase-shifting network with condenser 27 and grid-resistance 28 to its grid.

Via a preferably small coupling condenser 29 the oscillator-voltage is fed to an inductance 30 arranged in the cathode lead of the diode 21 to compare its phase with that of the pulse-voltage derived from transformer 19. The diode acts as a peak-detector for the combined voltages and causes an output-voltage across output-resistance 31, which is dependent on the phase-relationship between the pulse and oscillator voltage. This output voltage is fed as control voltage to the grid of the reactance-valve 26 through D. C.-passing connections including a low-pass filter with series-resistance 32 and shunt-condenser 33, which low-pass filter on the one hand has a sufficiently small time constant to pass audio-frequency oscillations but on the other hand substantially prevents unwanted mixer-output frequencies from influencing the frequency modulator 26. To this end the cut-off frequency of the low-pass filter should not exceed half the pulse repetition frequency.

If in the above described circuit the oscillator is tuned by means of tuning condenser 23 to about the central frequency of any arbitrary higher harmonic of the pulse voltage, the duration of the pulses being small with respect to e. g. one quarter of a period of the oscillator-voltage, then interlocking of the oscillator-frequency and the nearest higher harmonic of the pulse voltage occurs with regards to frequency and modulation.

The "impulse governed oscillator" 22 mean output frequency may be made a high multiple of, for example 300 times, the frequency of the crystal 2. It follows that a small phase modulation, for example one tenth of a radian, in the impulse repetition frequency may be reproduced as 30 radians at the output frequency of the impulse governed oscillator. By suitably shaping, in known manner, the audio frequency characteristic of a modulation amplifier inserted between the modulation source 17 and the clamping diode 15, the impulse governed oscillator output frequency may be arranged to have wide-band frequency-modulation equalised over a wide band of modulation frequencies. The stability of the central output frequency may be very high as this is given by the stability of the crystal controlled oscillator 1—4.

Each or all the elements in the circuit arrangement shown in Fig. 1, i. e. the pulse generator 1—4 with associated modulating means 15—18, the high-frequency oscillator 22—25 and the frequency modulator 26—28 coupled thereto, as well as the phase-comparison device 20, 21, 30, 31 can of course, without departure from the scope of the invention, be replaced by equivalent elements, in the manner indicated below by way of example.

Thus for instance the pulse generator with associated modulating means may be constituted by a crystal-controlled, 10 kc. sine-wave oscillator followed by a delay network comprising series inductances with ferromagnetic cores premagnetised in proportion with the time-integral of a modulating voltage, the resulting frequency modulated oscillation controlling pulse-forming and shaping means or interlocking a pulse-generator, delivering pulses less than 1 μsec. to the phase comparison stage so as to enable interlocking of the impulse governed oscillator on e. g.

the 100th or 300th harmonic of the pulse repetition frequency.

The oscillator 22—25 and frequency modulator 26—28 coupled thereto may be replaced by an oscillator of any arbitrary type with a frequency determining circuit comprising an inductance with ferromagnetic core premagnetised in proportion with the control voltage generated by the phase-comparison stage. Alternatively it is possible to simplify the shown circuit by feeding the control voltage directly to the oscillator-grid instead of to the grid of the reactance-valve.

Instead of the peak-detecting diode mixer 20, 21, 30, 31 in Figure 1 another suitable mixer may be used as phase-comparison device, e. g. a mixer as shown in U. S. Patent 2,611,093, issued September 16, 1952, comprising a normally blocked pentode with a control grid and anode, to which respectively the high-frequency voltage and the pulse-voltage are applied so as to deblock the valve during the pulses only. The wanted control-voltage then is generated in the anode-circuit.

Figure 3:
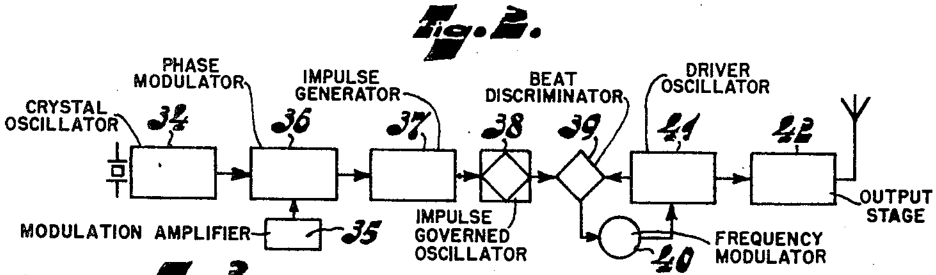
Figures 3 and 4 show frequency or phase modulation transmitters according to the invention.

A circuit-arrangement for use in high-power transmitters having a wide band phase or frequency-modulation is shown in block schematic form in Figure 3, in which the output of a crystal oscillator 34 and the output of a modulation amplifier 35 are supplied to a phase-modulator 36, the phase-modulated output of which is supplied to an impulse generator 37 which in turn controls an impulse governed oscillator with associated frequency modulator and phase comparison device, as set forth in connection with Figure 1 and shown here in block form 38.

The cascade 34—38 is not directly suitable for use in a high-power transmitter, since using normal valves and components, the output of the impulse governed oscillator will be somewhat less than one watt. To meet this drawback and in order to obviate any unfavourable influencing of the cascade 34—38 by a transmitter driver stage the output from the impulse governed oscillator 38 is supplied to a phase comparison device 39 with a D. C.-passing output comprising a low-pass filter passing modulation voltages (so-called "beat discriminator") so as to generate a control-voltage applied to a frequency modulator 40 in order to synchronise and interlock a driver stage oscillator 41 with the frequency and modulation of the output voltage of the impulse governed oscillator 38 in a manner similar to that described above with reference to the impulse governed oscillator itself. The driver-stage 41 is in turn followed by an output stage 42. The driver-stage 41 is preferably not used directly as an output stage since variations in the output impedance would tend to pull its frequency out of the range of restoration by the frequency control device 40. This arrangement provides a frequency- or phase-modulated transmitter of great economy and simplicity, since the chain of frequency multipliers commonly used in directly controlled frequency modulation transmitters is eliminated. It is also capable of quick resetting on a number of mean frequencies, multiplies of the fundamental frequency of the crystal, which is especially advantageous in communications and military transmitters to which operating frequencies may be allotted.

Figure 4:
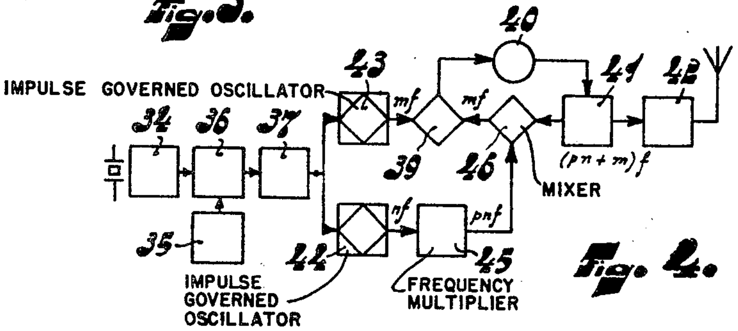

For operation on still higher multiples of the fundamental frequency of a crystal, for example up to about the 1500th multiple of say 100 kcs., the arrangement shown in Fig. 4 may conveniently be used. In this arrangement the phase-modulated output from the combination of crystal oscillator 34, modulation amplifier 35, phase modulator 36 and impulse generator 37, is fed to two impulse governed oscillators 43 and 44 operating at frequencies $mf$ and $nf$ respectively, where $f$ is the crystal frequency and $m$ and $n$ are positive integers, as are also $p$, $q$ and $r$ to be used hereafter. The impulse governed oscillator 44 drives a frequency multiplier 45 which gives an output of frequency $pnf$. This output of frequency $pnf$ is mixed with the output of driver oscillator stage 41 in a superheterodyning stage 46 and the mixer output is supplied to beat discriminator 39 together with the output of frequency $mf$ from the impulse governed oscillator 43. The frequency control device 40 again acts on the driver stage 41 and ensures that the output of the mixer 46 is interlocked as regards frequency and modulation with the output of impulse governed oscillator 43 with central frequency $mf$. Thus if the driver oscillator 41 is tuned to a frequency in the neighbourhood of the frequency $(pn+m)f$, it is, by virtue of the circuit-arrangement, locked exactly to that frequency. The output of the driver stage 41 is supplied to the output stage 42. By alternative installation, the final frequency, i. e. the output frequency of the driver and output stages may be made $(pn-m)f$.

As an example of the order of frequency finally obtained, the following figures are given:

$m=163$
$n=195$
$p=4$
$pn+m=943$
$f=100$ kcs./sec.
Output frequency$=(pn+m)f=94.3$ mcs./sec.

In order to serve economically a wide area with very high-frequency signals, a number of spaced stations of moderate power carrying the same modulation is known to be more economical than a single station of very high power. It is necessary to ensure, however, that no interference is caused at the common boundaries of service areas of such stations. One proposed arrangement to ensure this is to use amplitude modulation, to space the carrier frequencies of all stations sufficiently widely to avoid overlap of sidebands, and to use a receiver with a pass-band wide enough to respond to any station. Such a method is, however, somewhat uneconomical from the aspect of frequency allocation, and is hardly applicable to frequency modulation. By means of the present invention the frequencies (including thereunder the modulated frequencies) of a number of stations which are referred to in this specification as "slave" stations may be exactly synchronised to that of another station which is referred to as a "master" station.

Figure 5:
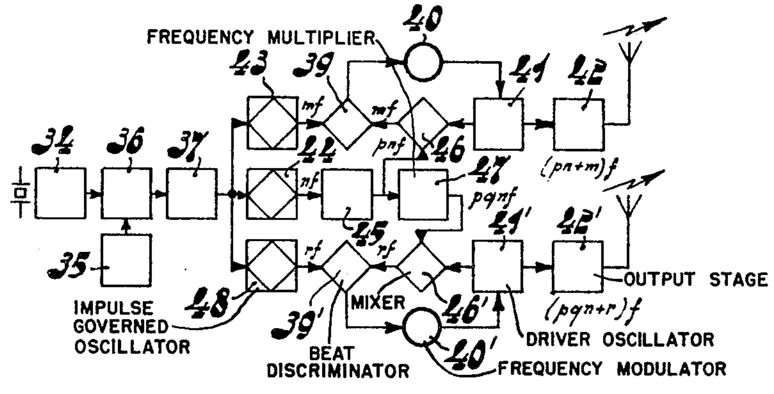
Figures 5 and 6 show a master station and a slave station respectively of a frequency or phase modulation signalling system designed to serve economically a wide area.

Figure 5 shows the block schematic diagram of such a master station and comprises the transmitter arrangement shown in Figure 4 with central output frequency $(pn+m)f$. With little, if any, restriction in the choice of frequency, a second multiplier 47 driven by the multiplier 45 provides an additional output with a frequency, hereinafter called the "link" frequency, used for communicating modulation to the slave stations. The link frequency is provided by adding the output of a third impulse governed oscillator 48, which is driven as are impulse governed oscillators 43 and 44 by the pulse generator 37, of frequency $rf$ in the manner described with reference to Fig. 4 to the output of multiplier 47, producing, with the use of a combination comprising a beat discriminator 39', a mixer 46', a frequency modulator 40', a driver oscillator stage 41', and an output stage 42', an output of frequency $(pqn+r)f$ being then radiated from an aerial system. As explained above, difference frequencies may be used instead of sum frequencies. Moreover, if the restriction imposed by the use of the common multiplier 45 is irksome for any application, a fourth impulse governed oscillator may be used to assist in providing the link frequency output.

The link frequency output thus carries the same modulation with the same deviation ratio as the main frequency output.

Figure 6:
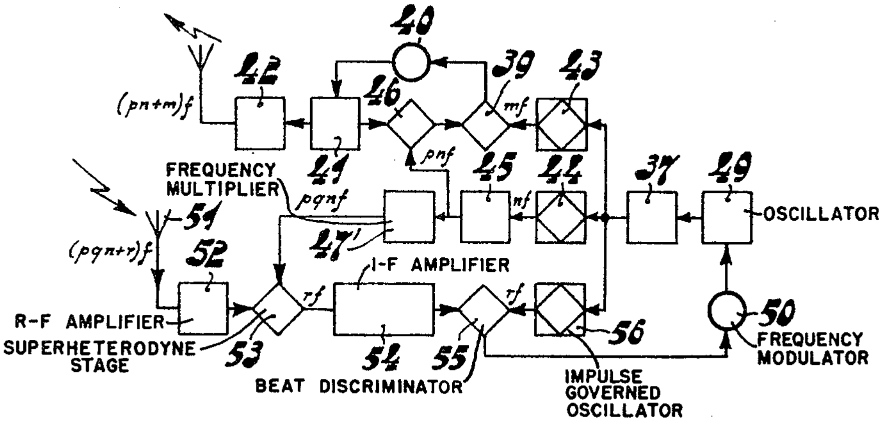

Figure 6 shows the block schematic diagram of a slave station comprising as the main station a transmitter arrangement as shown in Figure 4 with elements 34—36 replaced by an oscillator 49 with associated frequency modulator 50 and the addition of an extra freqeuncy multiplier 47' equalling the multiplier 47 in Figure 5. The link frequency input is received by a superheterodyne receiver of normal construction and comprising a receiving aerial system 51, an R. F.-amplifier 52, a superheterodyning stage 53 and an I. F. amplifier stage 54, the local oscillation frequency being supplied by way of frequency multipliers 45 and 47 of multiplication factors $p$ and $q$ respectively from an impulse governed oscillator 44. Impulse governed oscillator 44 is driven at $n$ times the frequency $f$ of the controlled oscillator 49, the manner of control of which will be explained below, by way of pulse generator 37. The output from the intermediate frequency amplifier is compared in a beat discriminator 55 with that of an impulse governed oscillator 56 driven at a frequency $rf$ by the controlled oscillator 49 and the pulse generator 37. The output of the beat discriminator 55, which controls the frequency of the controlled oscillator 49 with the interposition of a frequency modulator 50, is steady only if the intermediate frequency is $r$ times the frequency of the controlled oscillator 49. This condition is fulfilled if the latter is $f$, from which follows that the superheterodyne local oscillator frequency is $pqnf$. Thus, the controlled oscillator 49 exactly follows the instantaneous frequency of the pulse generator 37 of Figure 5 at the master station. The receiving arrangement in Figure 6 thus behaves like a frequency divider.

The above mentioned transmitter arrangement similar to that at the master station provides, as in the master station, an output of the main frequency from the slave station aerial system 57.

In this manner, the main transmitters of the master station and all slave stations are synchronised and carry the same frequency modulation.

We claim:

1. In wavelength modulation apparatus, a first source of recurrent pulses providing a spectrum of harmonic components, a second source of high-frequency oscillations tunable in a range whose frequencies are within said spectrum and higher than the fundamental recurrence rate of said pulses, a frequency control element coupled to one of said sources, means to wavelength modulate the other of said sources with a signal, a phase comparison device, means applying the wave produced by said second source to said phase comparison device, means applying the wave produced by said source of recurrent pulses to the phase comparison device to mix said relatively high-frequency oscillations with the higher harmonic components in the spectrum of said pulses to produce a resultant voltage, a low-pass filter connected to the output of said device to select from said resultant voltage a control voltage dependent on the wavelength displacement between said oscillation and a given higher harmonic component in the spectrum of said pulses, and means to apply said control voltage to said frequency control element to interlock said oscillations both as to wavelength modulation and as to frequency with said given harmonic component.

2. Apparatus as set forth in claim 1 wherein said low-pass filter has a cut-off frequency which is smaller than half the recurrence rate of said pulses.

3. In wavelength modulation apparatus, a source of recurrent pulses, first and second generators for respectively producing first and second high-frequency oscillations, said first high-frequency oscillations having a frequency higher than the recurrence rate of said pulses, said second high-frequency oscillations having a frequency higher than that of said first high-frequency oscillations, first and second frequency control elements respectively coupled to said first and second generators, means to wavelength modulate said source, first and second phase comparison devices, said first device being coupled to said source and said first generator and responsive to said first high-frequency oscillations and said pulses to derive therefrom a first control voltage dependent on the difference therebetween, said second device being coupled to said first and second generators and responsive to said first and second high-frequency oscillations to derive therefrom a second control voltage dependent on the difference therebetween, means including a first low-pass filter for direct coupling of said first device to said first element to supply said first control voltage to said first element, and means including a second low-pass filter for direct coupling of said second device to said second element to supply said second control voltage to said second element whereby the first high-frequency oscillations are automatically interlocked both as to wavelength modulation and as to frequency with a harmonic in the spectrum of said recurrent pulses and whereby the second high-frequency oscillations are automatically interlocked both as to wavelength modulation and as to frequency with a harmonic of said first high-frequency oscillations.

4. In wavelength modulation apparatus, a source of recurrent pulses, first, second and third generators for respectively producing first, second and third high-frequency oscillations, said first and third high-frequency oscillations having a frequency higher than the recurrence rate of said pulses, said second high-frequency oscillations having a frequency higher than that of said first high-frequency oscillations, first, second and third frequency control elements respectively coupled to said first, second and third generators, means to wavelength modulate said source, a frequency multiplier coupled to said third generator to derive frequency multiplied oscillations from said third high-frequency oscillations, a superheterodyning stage coupled to said second generator for heterodyning said second high-frequency oscillations with a heterodyning signal, means to supply said frequency multiplied oscillations as a heterodyning signal to said superheterodyning stage, first, second and third phase comparison devices, said first device being coupled to said source and said first generator and responsive to said pulses and said first high-frequency oscillations to derive therefrom a first control voltage dependent on the difference therebetween, said second device being coupled to said first generator and said superheterodyning stage and responsive to said first and second heterodyned high-frequency oscillations to derive therefrom a second control voltage dependent on the difference therebetween, said third device being coupled to said source and said third generator and responsive to said pulses and said third high-frequency oscillations to derive therefrom a third control voltage dependent on the difference therebetween, means including a first low-pass filter for direct coupling of said first device to said first element to supply said first control voltage to said first element, means including a second low-pass filter for direct coupling of said second device to said second element to supply said second control voltage to said second element, and means including a third low-pass filter for direct coupling of said third device to said third element to supply said third control voltage to said third element whereby the first and third high-frequency oscillations are automatically interlocked both as to wavelength modulation and as to frequency with a harmonic in the spectrum of said recurrent pulses and whereby the second high-frequency oscillations are automatically interlocked both as to wavelength modulation and as to frequency with a harmonic of said first high-frequency oscillations.

5. Apparatus as set forth in claim 4 wherein said first and third low-pass networks have different frequency response characteristics whereby said first and third high-frequency oscillations are respectively interlocked with different harmonics in the spectrum of said recurrent pulses.

6. In wavelength modulation apparatus responsive to an applied wavelength modulated high-frequency signal, a source of recurrent pulses, a generator for generating high-frequency oscillations whose frequency is higher than the recurrence rate of said pulses, first and second frequency control elements respectively coupled to said source and said generator, a superheterodyning stage, first and second phase comparison devices, means to supply said wavelength modulated signal through said superheterodyning stage as a first input to said first device, means to supply said oscillations as a second input to said first device, said first device producing a first control voltage dependent on the difference between said heterodyned signal and said oscillations, said second device being coupled to said source and said generator and responsive to said pulses and said oscillations to derive therefrom a second control voltage dependent on the difference therebetween, means including a first low-pass filter for direct coupling of said first device to said first element to supply said first control voltage to said first element, and means including a second low-pass filter for direct coupling of said second device to said second element to supply said second control voltage to said second element whereby said pulses are automatically interlocked both as to wavelength modulation and as to frequency with a subharmonic of said wavelength modulated signals.

7. In wavelength modulation apparatus responsive to an applied wavelength modulated high-frequency signal, a source of recurrent pulses, first and second generators for generating first and second high-frequency oscillations whose frequencies are higher than the recurrence rate of said pulses, first, second and third frequency control elements respectively coupled to said source and said first and second generators, a superheterodyning stage responsive to said modulated signal for heterodyning said modulated signal with a heterodyning signal, a frequency multiplier stage, means to supply said second oscillations through said frequency multiplier as a heterodyning signal to said heterodyning stage, first, second and third phase comparison devices, said first device being coupled to said superheterodyning stage and said first generator and responsive to said heterodyned signal and said first oscillations to derive therefrom a first control voltage depending on the difference therebetween, said second device being coupled to said source and said first generator and responsive to said pulses and said first oscillations to derive therefrom a second control voltage dependent on the difference therebetween, said third device being coupled to said source and said second generator and responsive to said pulses and said second oscillations to derive therefrom a third control voltage dependent on the difference therebetween, means including a first low-pass filter for direct coupling of said first device to said first element to supply said first control voltage to said first element, means including a second low-pass filter for direct coupling of said second device to said second element to supply said second control voltage to said second element, and means including a third low-pass filter for direct coupling of said third device to said third element to supply said third control voltage to said third element whereby said pulses are automatically interlocked both as to wavelength modulation and as to frequency with a subharmonic of said wavelength modulated signals and said second oscillations are automatically locked both as to wavelength modulation and as to frequency with a harmonic in the spectrum of said recurrent pulses.

8. In wavelength modulation relay apparatus for receiving a first wavelength modulated high-frequency signal and transmitting a second high frequency signal; a receiver system comprising a first source of first recurrent pulses, a first generator for generating first high-frequency oscillations whose frequency is higher than the recurrence rate of said first pulses, first and second frequency control elements respectively coupled to said source and said first generator, a superheterodyning stage, first and second phase comparison devices, means to supply said first wavelength modulated signal through said superheterodyning stage as a first input to said first device, means to supply said first oscillations as a second input to said first device, said first device producing a first control voltage dependent on the difference between said heterodyned signal and said first oscillations, said second device being coupled to said first source and said first generator and responsive to said first pulses and said first oscillations to produce a second control voltage dependent on the difference therebetween, means including a first low-pass filter for direct coupling of said first device to said first element to supply said first control voltage to said first element, and means including a second low-pass filter for direct coupling of said second device to said second element to supply said second control voltage to said second element whereby said first pulses are automatically interlocked both as to wavelength modulation and as to frequency with a subharmonic of said first wavelength modulated signals; and a transmitter system comprising a second source of second recurrent pulses, a second generator for generating said second high-frequency signals whose frequency is higher than the recurrence rate of said second pulses, a third frequency control element coupled to said second generator, means to wavelength modulate said second source with said first pulses, a third phase comparison device coupled to said second source and said second generator and responsive to said second pulses and said second oscillations to derive therefrom a third control voltage dependent on the difference therebetween, and means including a third low-pass filter for direct coupling of said third device to said third element to supply said third control voltage to said third element whereby said second oscillations are automatically interlocked both as to wavelength modulation and as to frequency with a harmonic in the spectrum of said second recurrent pulses.

References Cited in the file of this patent

UNITED STATES PATENTS

| Number | Name | Date |
|---|---|---|
| 2,201,978 | Bedford | May 28, 1940 |
| 2,209,507 | Campbell | July 30, 1940 |
| 2,227,596 | Luck | Jan. 7, 1941 |
| 2,401,007 | Loughlin | May 28, 1947 |

FOREIGN PATENTS

| Number | Country | Date |
|---|---|---|
| 168,033 | Austria | Apr. 10, 1951 |